United States Patent [19]

Sexton et al.

[11] Patent Number: 5,687,198
[45] Date of Patent: Nov. 11, 1997

[54] CHANNEL ESTIMATION IN A COMMUNICATION SYSTEM

[75] Inventors: Thomas A. Sexton, Schaumburg; Fuyun Ling, Hoffman Estates, both of Ill.

[73] Assignee: Motorola, Inc., Schaumburg, Ill.

[21] Appl. No.: 582,691

[22] Filed: Jan. 4, 1996

[51] Int. Cl.$^6$ ...................................................... H04B 1/76
[52] U.S. Cl. ........................................... 375/347; 375/348
[58] Field of Search .................................. 370/342, 441, 370/491; 375/205, 346, 347, 348

[56] References Cited

U.S. PATENT DOCUMENTS

| | | | |
|---|---|---|---|
| 5,136,612 | 8/1992 | Bi | 375/200 |
| 5,440,267 | 8/1995 | Tsuda et al. | 375/332 |

*Primary Examiner*—Melvin Marcelo
*Attorney, Agent, or Firm*—Richard A. Sonnentag

[57] ABSTRACT

A receiver (200, 400) implements improved channel estimation. The receiver (200, 400) demodulates a transmitted signal, and makes an initial channel estimate (115). The receiver (200, 400) then makes a hard decision (301) as to whether the channel estimate was correct and groups samples representing the decision. A vector sum of the group of samples is computed (302), and each sample is compared to the vector sum (303). The sample having the largest projection on the vector sum is retained (304), and the other samples are considered noise, and are thus discarded (305). After obtaining a predetermined number of retained samples (306), the retained samples are used to generate an new channel estimate (226). Since the noisy estimates are discarded, the new channel estimate (226) contains fewer errors than the initial channel estimate (115). The new channel estimate (226) is used to generate decoded data (250).

11 Claims, 5 Drawing Sheets

AVAILABLE DATA SEQUENCE

CHANNEL ESTIMATION IN A COMMUNICATION SYSTEM

FIELD OF THE INVENTION

The present invention relates generally to communication systems and, more particularly, to improved channel estimation in such communication systems. Reference is made to U.S. patent application Ser. No. 08/582,856, "Method and Apparatus for Coherent Channel Estimation in a Communication System" on behalf of Ling et al., filed on the same date herewith, containing related subject matter, assigned to the assignee of the present invention and incorporated herein by reference.

BACKGROUND OF THE INVENTION

Many communication systems depend on either a pilot channel or a transmitted known pattern (marker) at the receiver to demodulate signals so that low bit (or frame) error rates are achieved. In general, the lower the error rates, the better the call quality throughout the communication system. Such receivers which depend upon either the pilot channel or a transmitted known pattern (marker) are typically labeled coherent receivers. Examples of such digital communication systems incorporating coherent receivers include, but are not limited to, Groupe Special Mobile (GSM, the European standard for time division multiple access, or TDMA), Interim Standard-54 (IS-54, the United States standard for TDMA), Pacific Digital Cellular (PDC, the Japanese standard for TDMA) and the forward link (base station to mobile station) in Interim Standard-95 (IS-95, the United States Standard for code division multiple access, or CDMA). Alternate receiver designs have been proposed for the reverse link (mobile station to base station) of IS-95 which would include the capability to demodulate signals to achieve low bit (or frame) error rates by using a pilot channel or marker transmitted on the reverse link. Currently, however, no pilot channel or marker is transmitted on the reverse link in IS-95.

The general operation of a transmitter-receiver link which uses a pilot channel (or marker) is well known in the art. First we consider the transmitter portion. A time sequence of symbols {S} is transmitted made up of pilot sequence (R) and a data sequence (D). The energy in the pilot sequence is $E_{pilot}$ and that in the data sequence is $E_{data}$. Consequently, $E_{total}=E_{pilot}+E_{data}$. If the ratio of $E_{data}$ to $E_{pilot}$ is defined as k, then $E_{total}=[E_{data}*(1+k)]/k$. With this in mind, the time sequence of symbols {S} can be expressed as:

{S}=R(0), D(1), D(2), . . . , D(k), R(k+1), D(k+2), . . . , D(2k+1), R(2k+2), . . .

where

S(n)=R(n) if n modulo (k+1)=0

S(n)=D(n) for other n.

Now, the signal received has a sequence which can be expressed as:

s(n)=h(n)S(n)+z(n)

where h is the complex flat fading channel gain and z is the additive noise. The received sequence can be further broken down into the pilot and data portions by:

s(n)=r(n) if n modulo (k+1)=0 s(n)=d(n) for other n.

FIG. 1 generally depicts a block diagram of a prior art coherent receiver suitable for use in a digital communication system. As defined above, the received symbol sequence is denoted s(n). For a TDMA symbol format, a signal 100 is received by an antenna 101 and enters block 103 for processing as is well known in the art. The output of block 103 is the signal s(n), which is input into a time demultiplexor 106 which separates s(n) into the pilot sequence r(n) 109 and a data sequence d(n) 112. The data sequence d(n) 112 is buffered in a delay element 113 while a channel estimation filter 114 smoothes the pilot sequence r(n) 109 to produce a channel estimate ($h_{pilot}(n)$) 115. The conjugate of $h_{pilot}$ 115 is used by a multiplier 118 to remove the channel rotation and to amplitude weight the faded noisy buffered data 117 exiting the delay element 113. The resulting corrected and weighted signal 119 is combined with like signals from other diversity elements by the summer 121 to produce a combined signal 122. The combined signal 122 is passed to a conventional deinterleaver and decoder 124 whose output is the ultimate desired data 150.

One of the challenges in receiving a signal as explained above is to generate an accurate channel estimate, $h_{pilot}$. As is well known in the art, cellular capacity is maximized when the $E_{total}$ of each user is minimized while maintaining acceptable error rate requirements (typically 1% error rates are acceptable). The optimal k to meet this tradeoff depends on the channel type (fading or not), maximum vehicle speed, maximum carrier frequency error, the primary data rate sent, and the receiver complexity which will be tolerated. Let us consider what various values of k represent.

If k=0, all the transmitted energy is in the pilot sequence. In this case, an excellent channel estimate would be obtained, but the data symbols themselves would have 0 amplitude and the good channel estimate is wasted. Clearly, k=0 does not represent a practical multiple access radio system.

If k is very large, tending to infinity, no energy is in the pilot sequence, thus all of the energy is in the data sequence. Radio systems operating without a channel estimate require large $E_{total}$'s since they are non-coherent (i.e., no reference sequence) and must suffer the effects of noise which may be orthogonal to the carrier frequency of the signal. As such, it is difficult to make an accurate channel estimate of a non-coherent channel (IS-95 reverse).

With k a moderate value, such as 3,4,5 or 6 (e.g., many digital time-division multiple access (TDMA) communication systems, IS-95 forward channel), a moderately good channel estimate can be obtained without much complexity. This allows the receiver to throw away most of the orthogonal noise without losing too much signal when demodulating the data sequences at a lower $E_{total}$ than for $E_{pilot}=0$. To improve this further would require increasing k only a bit while somehow not degrading the channel estimate, thus obtaining a yet lower $E_{total}$.

Thus, a need exists for improved channel estimation in a communication system which overcomes the shortcomings and tradeoffs presented in the prior art to provide improved call quality in the communication system.

3

Figure 5:
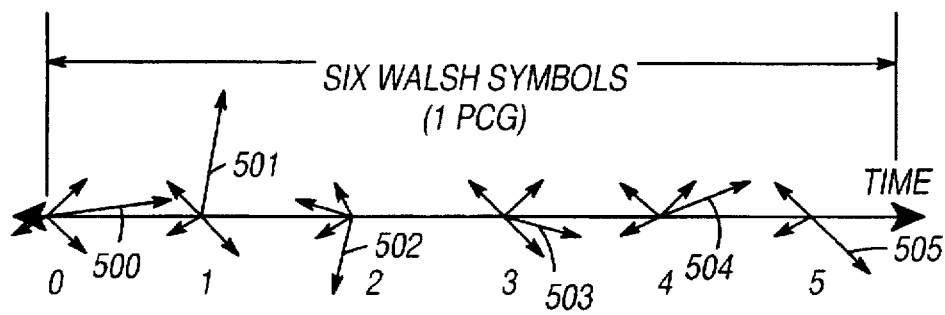

FIG. 5 generally depicts six FHT outputs during a predetermined time period of a power control group.

Figure 6:
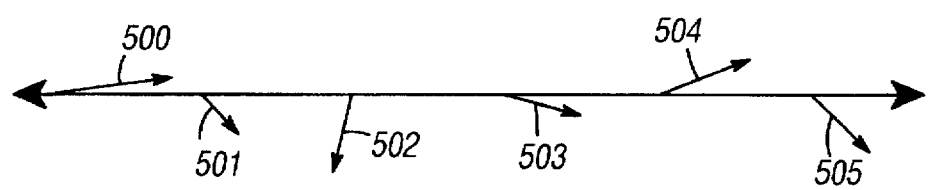

FIG. 6 generally depicts those vectors of FIG. 5 which produce the sequential sum having the greatest total length.

Figure 7:
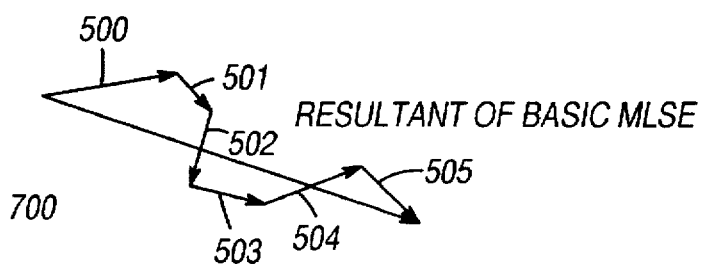

FIG. 7 generally depicts a resultant vector using maximum likelihood sequence estimation (MLSE) to perform channel estimation of the vectors of FIG. 6.

Figure 8:
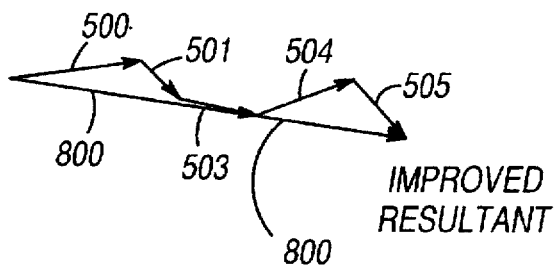

FIG. 8 generally depicts an improved resultant vector using improved channel estimation in accordance with the invention to perform channel estimation of the vectors of FIG. 6.

Figure 9:
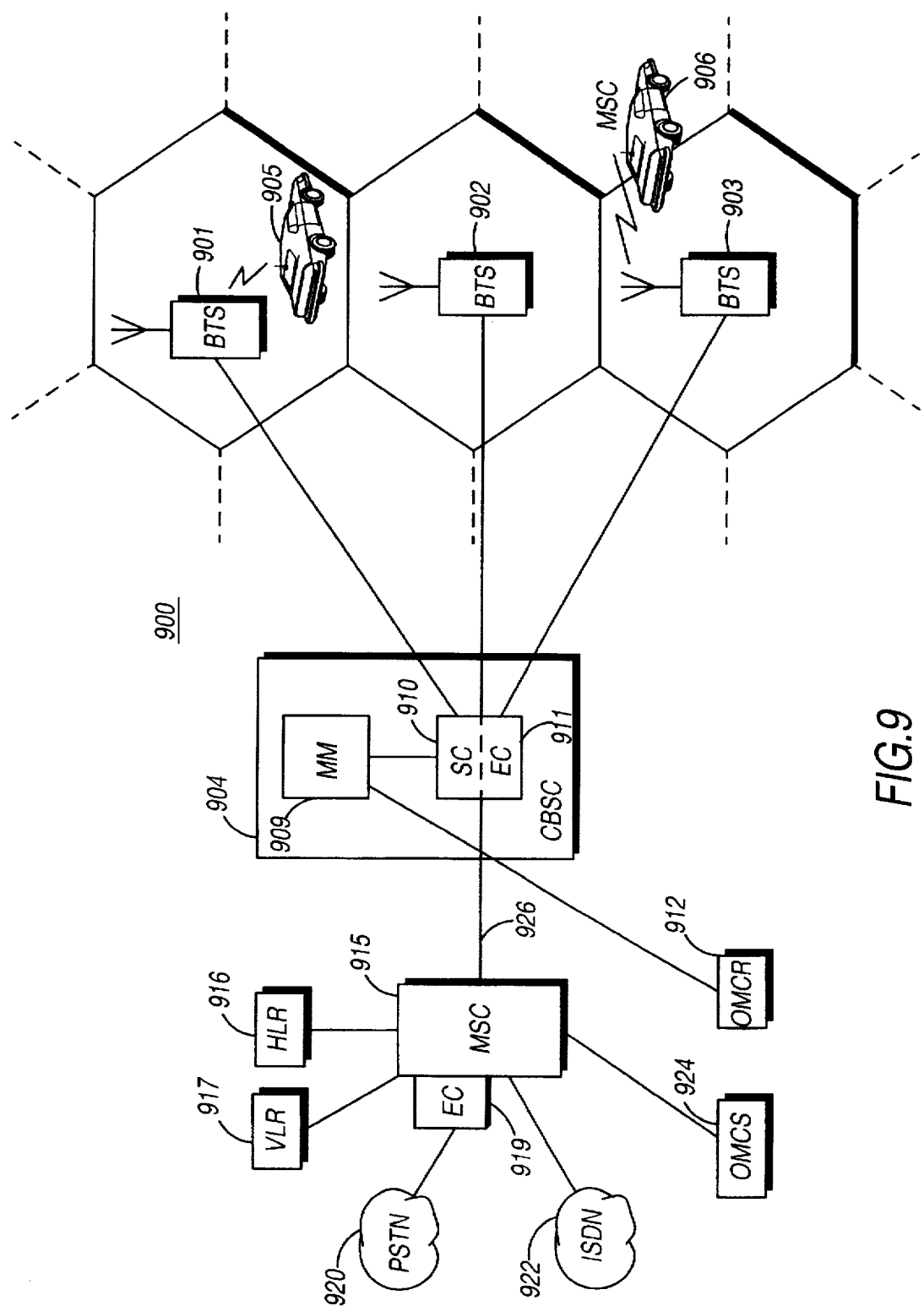

FIG. 9 generally depicts a block diagram of a communication system 900 which may beneficially implement improved channel estimation in accordance with the invention.

DETAILED DESCRIPTION OF A PREFERRED EMBODIMENT

A receiver implements improved channel estimation. The receiver demodulates a transmitted signal, and makes an initial channel estimate. The receiver then makes a hard decision as to what data symbol values were sent and groups samples representing decisions consecutive in time. A vector sum of the group of samples is computed, and each sample is compared to the vector sum. The sample having the largest projection on the vector sum is retained, and the other samples are considered noise, and are thus discarded. After obtaining a predetermined number of retained samples, the retained samples are used to generate an new channel estimate. Since the noisy estimates are discarded, the new channel estimate contains fewer errors than the initial channel estimate. The new channel estimate is used to generate decoded data.

Specifically, a method of estimating a channel in a communication system is provided. The communication system implementing signals including both a reference sequence and a data sequence, where the data sequence has errors as a result of a transmission of the signal. The method performs improved channel estimation by first receiving a transmitted signal which includes the reference sequence and the data sequence then estimating the channel based on the received reference sequence to produce a first channel estimate. Then, the first channel estimate is used to improve symbols of the data sequence in error to produce an improved data sequence. The improved data sequence is modified, and the channel is again estimated based on the modified data sequence to produce a second channel estimate. The second channel estimate is an improved channel estimate when compared to the first, initial, channel estimate. In the preferred embodiment, the improved data sequence is modified by first quantizing the sequence, removing unknown modulation information from the sequence and keeping a sample of the sequence from a predetermined group of samples based on a predetermined criteria, and discarding the remainder of the samples.

After the second channel estimate is obtained, it is used to further improve the improved data sequence to produce a twice improved data sequence. The twice improved data sequence is then decoded to produce decoded data. The decoded data produced using the twice improved data sequence contains fewer errors as decoded data produced by the prior art techniques, thus resulting in an improvement in call quality throughout the communication system.

Figure 1:
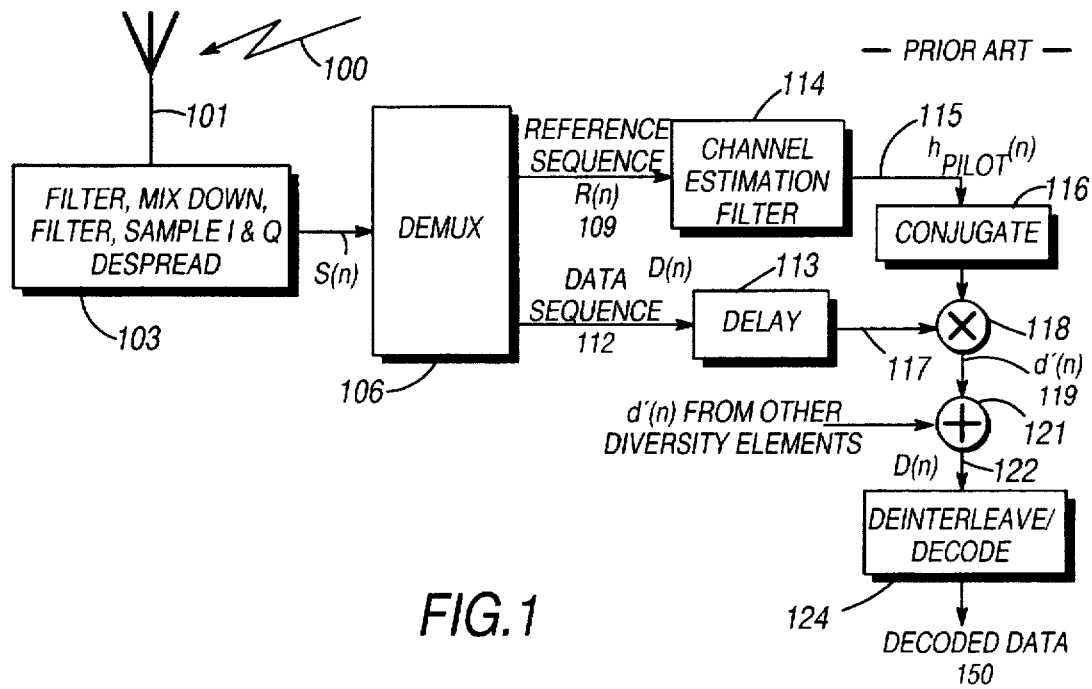
FIG. 1 generally depicts a block diagram of a prior art coherent receiver suitable for use in a digital communication system.
Figure 2:
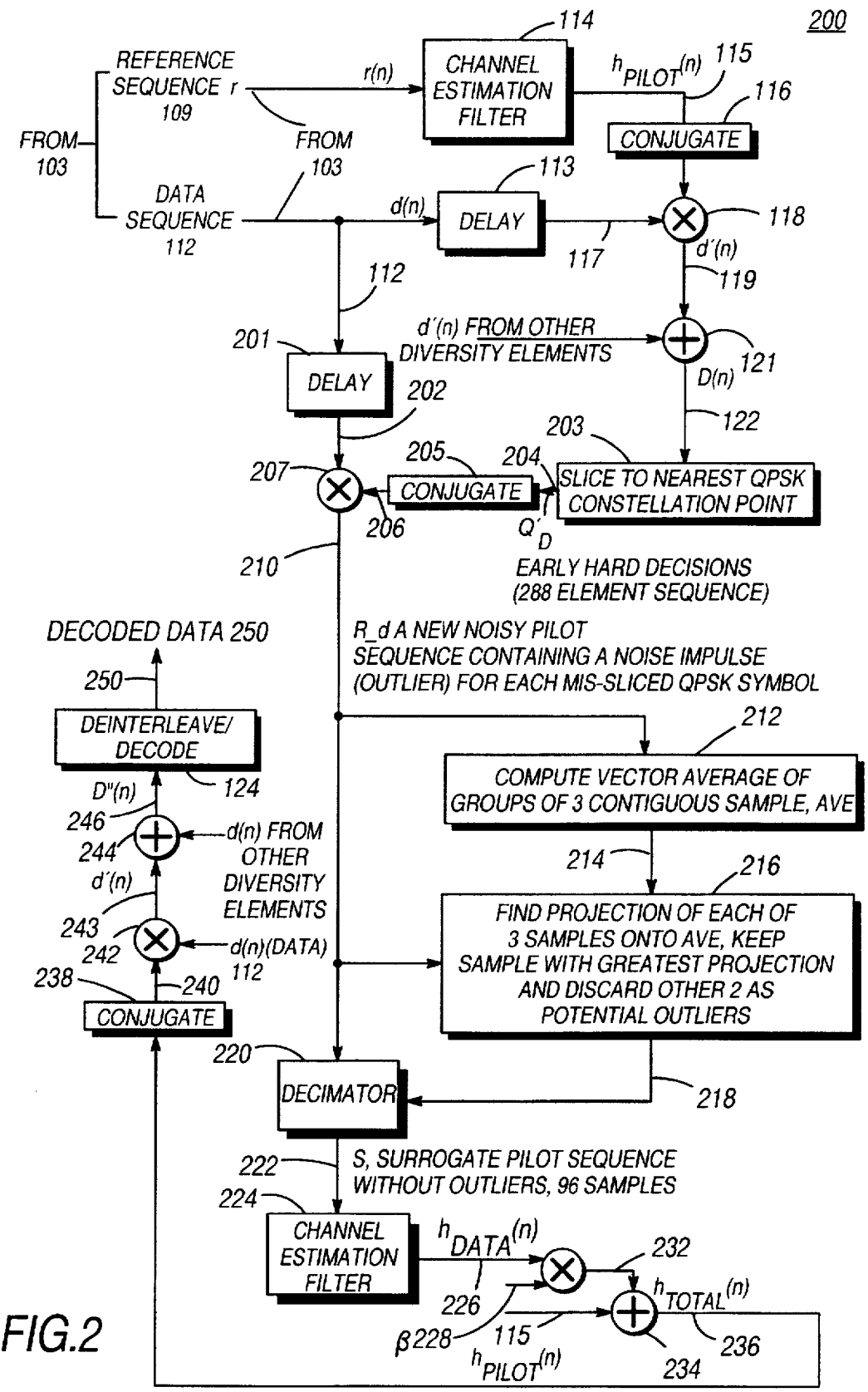
FIG. 2 generally depicts a block diagram of a coherent receiver which performs improved channel estimation in accordance with the present invention.

FIG. 2 generally depicts a block diagram of a coherent receiver 200 which performs improved channel estimation in accordance with the present invention. In the preferred embodiment, the receiver 200 is a coherent receiver, i.e., one that may utilize a reference sequence (or marker information) embedded in a received signal. Referring to FIG. 2, the reference sequence 109 and the data sequence 112 are treated in the same way as in FIG. 1, to the point where the combined signal 122 is generated utilizing the initial channel estimate 115. At this point, however, the combined signal 122 is not put into a deinterleaver/decoder 124 to produce decoded data 150, but is instead input into a block 203 where a "slice" to the nearest Quaternary Phase Shift Keyed (QPSK) constellation point occurs. The resulting signal 204 represents early hard decisions (designated Q), and in the preferred embodiment is a 288 element sequence. Continuing, the signal 204 is conjugated in block 205 to produce a conjugate signal 206. The conjugate signal 206 is then multiplied in a multiplier 207 by a delayed version 202 of the data sequence 112. At this point, the signal 210 exiting the multiplier 207 represents a new "noisy" pilot sequence (designated R_d).

At this point, a vector average of three continuous samples of the signal 210 is computed in block 212 to produce the signal 214. Three continuous samples are used in the preferred embodiment, but any number may be used as one of ordinary skill in the art will appreciate. Continuing, the signal 210 representing the "noisy" pilot sequence is compared to the signal 214 (which represents a channel estimate) in a projection block 216. Samples of the signal 210 with a poor projection with respect to the channel estimate 214 are considered "outliers", i.e. are incorrect selections from the QPSK constellation. Those samples estimated to be outliers are removed from the signal 210 by the decimator 220. Signal 218 contains the information regarding the samples considered to be outliers. The signal 222 exiting the decimator 220 is a surrogate pilot sequence having a reduced number of outliers. The signal 222 is then passed into a channel estimation filter 224 (similar to channel estimation filter 114).

The channel estimation filter 224 estimates the channel based on the signal 122 representing a surrogate pilot sequence which contains a reduced number of outliers. Since the samples considered to be outliers have been removed from the signal 210, the channel estimate 226 exiting the channel estimation filter 224 will be corrupted by additive noise decorrelated from the errors present in the channel estimate 115 determined in FIG. 1. The channel estimate $h_{data}$ is weighted by a factor $\beta$ and combined with the original pilot $h_{pilot}$ to form a final channel estimate signal 236, designated $h_{total}$. Signal 236 representing the final channel estimate $h_{total}$ is used to correct and weight the original data sequence 112, to eventually produce the signal 240. The signal 240 is then combined with like signals from other diversity elements producing the signal 246. The combined signal 246 is now input into the deinterleaver/decoder 124, where decoded data 250 is output. The error rate of the decoded data 250 is lower than that of the prior art decoded data 150 as shown in FIG. 1 since many of the outliers (wrong estimates) have been removed. Consequently an improvement in call quality can be readily apparent by implementing channel estimation in accordance with the present invention.

Figure 3:
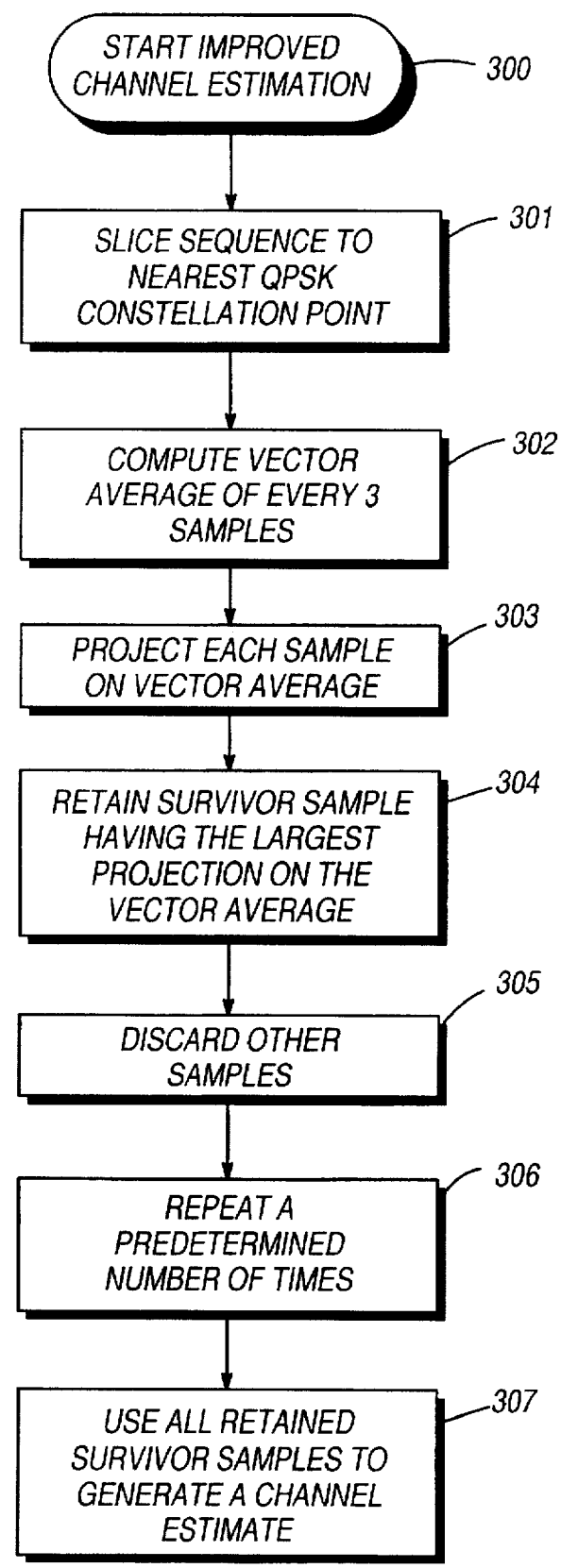
FIG. 3 generally depicts, in flow diagram form, the steps performed to achieve improved channel estimation in accordance with the invention.

FIG. 3 generally depicts, in flow diagram form, the steps performed to achieve improved channel estimation in accordance with the invention. The process starts at step 300 and proceeds to step 301 where the combined signal 122 is sliced to the nearest QPSK constellation point. Put another way, each sample of the combined signal 122 is assigned its nearest neighbor in the QPSK constellation (points 0.7+j.7, −0.7+j.7, −0.7−j.7,0.7−j.7). Important to note is that greater than 10% of these slices (or assignments) will be to the wrong QPSK constellation points. These are the samples which are determined to be outliers as described above, and defined in greater detail below as a significant cause of degradation in call quality in the communication system.

To remove the 10% of slices (assignments) which are in error the signal 210 which represents the noisy pilot sequence is next put through the following process. At step 302, for every three samples, a vector average is computed. Next, at step 303, each of the three samples are projected on the vector average. The projection, p, of a complex number $v_1$ (2 element vector) onto another complex number $v_2$ is given by p=Real($v_1$*conj($v_2$)) where "conj( )" is the conjugate operation. Using the projection, the data sample (out of the three data samples) having the largest magnitude projection on the vector average is retained at step 304 as a survivor sample, while the remainder of the data samples are discarded at step 305. In the preferred embodiment, the remainder of the data samples that are discarded are determined to be outliers, or incorrect hard decisions (slicer assignments). Continuing, steps 301–305 are repeated a predetermined number of times at step 306, and a signal 222 having the retained samples is used to generate a channel estimate. Having removed the outliers (those samples representing incorrect hard derisions), the resulting signal represents a surrogate pilot sequence (signal 222) with a reduced number of outliers. In the preferred embodiment the signal 222 is a 96 element sequence. Note that the signal 222, which represents the surrogate pilot sequence, has ⅓ as many samples as the signal 204 which represents the early hard decisions; ⅔ of the samples in the signal 222 have been discarded. By using the signal 222 to form a channel estimate, improved channel estimation in accordance with the invention is achieved.

While the preferred embodiment of the present invention is a coherent receiver, improved channel estimation in accordance with the invention can also be beneficially implemented in a non-coherent receiver. For example, one such receiver which may beneficially implement the above-described technique is a receiver compatible with a code division multiple access (CDMA) communication as defined by the Interim Standard (IS) 95. For more information on IS-95, see TIA/EIA/IS-95, *Mobile Station-Base Station Compatibility Standard for Dual Mode Wideband Spread Spectrum Cellular System*, July, 1993, incorporated herein by reference.

Figure 4:
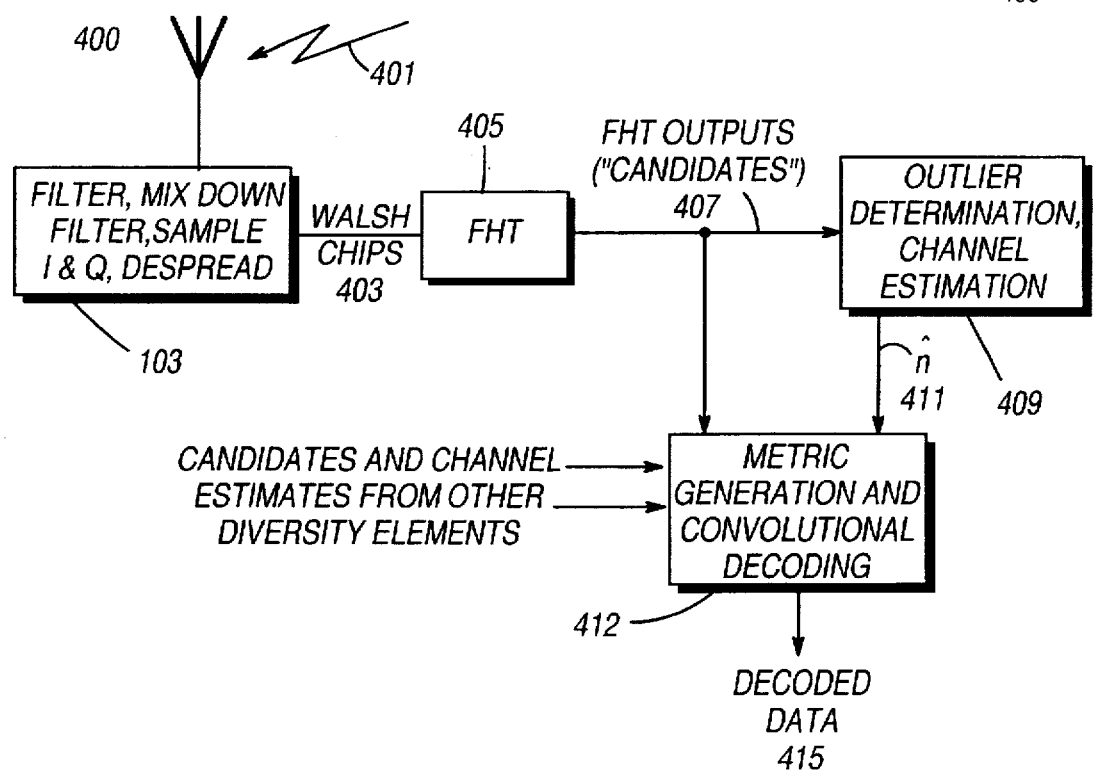
FIG. 4 generally depicts a receiver compatible with the reverse link (mobile to base-station) of IS-95 which may beneficially implement improved channel estimation in accordance with the invention.

FIG. 4 generally depicts a receiver compatible with the reverse link (mobile to base-station) of IS-95 which may beneficially implement improved channel estimation in accordance with the invention. As shown in FIG. 4, a signal 401 (which does not contain a reference sequence) is input to a block similar to block 103 as shown in FIG. 1. Output from the block 103 are Walsh chips 403 which are input into a Fast Hadamard Transform (FHT) 405 which is well known in the art. Output from the FHT 405 are six FHT outputs 407. In the preferred embodiment 64 parallel FHT outputs (hereafter called "candidates") 407 are output from the FHT 405 during one Walsh symbol time period.

FIG. 5 generally depicts six FHT outputs 0–5 output from the FHT 405 during a predetermined time period. In the preferred embodiment, the predetermined time period of the six FHT outputs 0–5 shown in FIG. 5 represent a single power control group (PCG), which is defined in 6.1.3.1.7.1 of IS-95. Important to note that for each FHT output 0–5 only four of the 64 potential "candidates" are shown. In the preferred embodiment, only one of the four (in reality 64) projections represents the true signal; the other 3 (63) represent noise only. The challenge in the non-coherent receiver 400 of IS-95 is to (as accurately as possible) determine which of the 64 potential FHT outputs from the FHT 405 is the FHT output corresponding to the correct Walsh symbol.

FIG. 6 generally depicts those vectors (500–505) of FIG. 5 which produce the sequential sum having the greatest total length. This is the general concept behind maximum likelihood sequence estimation (MLSE), which is well known in the art. General MLSE is an exhaustive trial and error approach in which all possible combinations are formed, and the combination which is best (by some measure) is declared the maximum likelihood sequence. Exhaustive combinations are formed by choosing a candidate from time 0 and vector summing with a vector from time 1 followed by vector summing with a vector from time 2 and so on up to vector summing with a candidate from time 5. FIG. 6 portrays the particular data from each time which ended up contributing to the winning trial sequence as shown in FIG. 7. All other combinations form overall vectors all of which have resultant magnitudes less than that shown in FIG. 7.

As can be seen in FIG. 7, the vector 502 provides little (if any) value to the overall projection 700, and in fact is more than likely an FHT output yielding an incorrect estimate of the second Walsh symbol in the power control group shown in FIG. 5. Use of this incorrect vector 502 to produce decoded data would result in a degradation of call quality throughout the communication system. In fact, using the basic MLSE technique results in approximately a 30% error in Walsh symbol estimates. Put another way, almost two out of every six Walsh symbols in a power control group would be estimated to be incorrect.

FIG. 8 generally depicts an improved resultant 800 after improved channel estimation in accordance with the invention. After applying steps 301–305 above (FIG. 3), the vector 502 as shown in FIG. 7 would have been determined to be an outlier (i.e. an incorrectly chosen candidate). By replacing the vector 502 (as done by the outlier determination block 409 in FIG. 4 following the steps 301–305) with a zero length candidate, the improved resultant 800 results in decoded data which contains fewer errors than the decoded data produced by the resultant 700 of FIG. 7. The improved resultant 800, represented by signal 411 in FIG. 4, is an improved channel estimate which is input into a metric generation and convolutional decoding block 412. The operation of the metric generation and convolutional decoding block 412 is described in U.S. patent application Ser. No. (Docket CE02934R) filed on behalf of Ling et al., and incorporated herein by reference. Since improved signal 411 is a better channel estimate in a mean square sense than that obtained by a strictly MLSE implementation, the resulting decoded data 415 exiting the deinterleave/decode block 124 has fewer errors. Consequently, by implementing improved channel estimation in accordance with the invention, the fewer errors in the decoded data 415 produced by the improved channel estimate in accordance with the invention provides improved call quality throughout the communication system.

FIG. 9 generally depicts a block diagram of a communication system 900 which may beneficially implement improved channel estimation in accordance with the invention. In the preferred embodiment, the communication system is a code division multiple access (CDMA) cellular radiotelephone system. As one of ordinary skill in the art will appreciate, however, improved channel estimation in accordance with the invention can be implemented in any communication system which would benefit from such technique.

Referring to FIG. 9, acronyms are used for convenience. The following is a list of definitions for the acronyms used in FIG. 9:

BTS Base Transceiver Station
CBSC Centralized Base Station Controller
EC Echo Canceller
VLR Visitor Location Register
HLR Home Location Register
ISDN Integrated Services Digital Network
MS Mobile Station
MSC Mobile Switching Center
MM Mobility Manager
OMCR Operations and Maintenance Center—Radio
OMCS Operations and Maintenance Center—Switch
PSTN Public Switched Telephone Network
TC Transcoder As seen in FIG. 9, each BTS 901-903 provides radio frequency (RF) communication to an MS 905-906. The transmitter/receiver (transceiver) hardware implemented in the BTSs 901-903 and the MSs 905-906 to support the RF communication is defined in the document titled TIA/EIA/IS-95, *Mobile Station-Base Station Compatibility Standard for Dual Mode Wideband Spread Spectrum Cellular System,* July, 1993 available from the Telecommunication Industry Association (TIA). In that embodiment, the receiver of FIG. 4 would reside in the BTSs 901-903. FIG. 9 could likewise represent a CDMA communication which implements a reference sequence in the reverse link (MS 905-906 to BTSs 901-903). In that embodiment, the receiver of FIG. 2 would reside in the BTSs 901-903.

As can also be seen in FIG. 9, a BTS 901-903 is coupled to a CBSC 904. The CBSC 904 is responsible for, inter alia, call processing via the TC 910 and mobility management via the MM 909. Other tasks of the CBSC 904 include feature control and transmission/networking interfacing. For more information on the functionality of the CBSC 904, reference is made to U.S. Pat. No. 5,756,686 to Bach et al., assigned to the assignee of the present application, and incorporated herein by reference.

Also depicted in FIG. 9 is an OMCR 912 coupled to the MM 909 of the CBSC 904. The OMCR 912 is responsible for the operations and general maintenance of the radio portion (CBSC 904 and BTS 901-903 combination) of the communication system 900. The CBSC 904 is coupled to an MSC 915 which provides switching capability between the PSTN 920/ISDN 922 and the CBSC 904. The OMCS 924 is responsible for the operations and general maintenance of the switching portion (MSC 915) of the communication system 900. The HLR 916 and VLR 917 provide the communication system 900 with user information primarily used for billing purposes. ECs 911 and 919 are implemented to improve the quality of speech signal transferred through the communication system 900. The functionality of the CBSC 904, MSC 915, HLR 916 and VLR 917 is shown in FIG. 9 as distributed, however one of ordinary skill in the art will appreciate that the functionality could likewise be centralized into a single element.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, as will be understood by those skilled in the art, the improved channel estimation techniques described and claimed herein can also be adapted for use in other types of transmission systems like those based on time division multiple access (TDMA) and frequency division multiple access (FDMA) which implement non-coherent receivers. The corresponding structures, materials, acts and equivalents of all means or step plus function elements in the claims below are intended to include any structure, material, or acts for performing the functions in combination with other claimed elements as specifically claimed.

What we claim is:

1. A method of estimating a channel in a communication system, the communication system implementing signals including both a reference sequence and a data sequence, the data sequence having errors as a result of a transmission of the signal, the method comprising the steps of:

receiving a transmitted signal which includes the reference sequence and the data sequence;

estimating a channel based on the reference sequence to produce a first channel estimate;

using the first channel estimate to improve the data sequence in error to produce an improved data sequence;

modifying the improved data sequence to produce a modified data sequence; and estimating the channel again based on the modified data sequence to produce a second channel estimate.

2. The method of claim 1 further comprising the step of:

using the second channel estimate to further improve the improved data sequence to produce a twice improved data sequence; and decoding the twice improved data sequence to produce decoded data.

3. The method of claim 1, wherein the step of modifying the improved data sequence further comprises the steps of:

quantizing the improved data sequence into a predetermined group of samples; and retaining a survivor sample from the predetermined group of samples based on a predetermined criteria and discarding a remainder of the predetermined group of samples.

4. The method of claim 3, wherein the step of retaining the survivor sample further comprises the step of computing a vector average of the predetermined group of samples.

5. The method of claim 4, wherein the step of retaining the survivor sample based on predetermined criteria further comprises the step of retaining the survivor sample having a largest projection on the vector average of the predetermined group of samples.

6. An apparatus for estimating a channel in a communication system, the communication system implementing signals including both a reference sequence and a data sequence, the data sequence having errors as a result of a transmission of the signal, the apparatus comprising:

means for receiving a transmitted signal which includes the reference sequence and the data sequence;

means for estimating a channel based on the reference sequence to produce a first channel estimate;

means for improving the data sequence in error using the first channel estimate to produce an improved data sequence;

means for modifying the improved data sequence; and means for estimating the channel again based on the modified data sequence to produce a second channel estimate.

7. The apparatus of claim 6 further comprising:

means for further improving the improved data sequence using the second channel estimate to produce a twice improved data sequence; and means for decoding the twice improved data sequence to produce decoded data.

8. The apparatus of claim 6, wherein the means for modifying the improved data sequence further comprises:

means for quantizing the improved data sequence into a predetermined group of samples; and means for retaining a survivor sample from the predetermined group of samples based on a predetermined criteria and discarding a remainder of the predetermined group of samples.

9. The apparatus of claim 8, wherein the means for retaining the survivor sample further comprises means for computing a vector average of the predetermined group of samples.

10. The apparatus of claim 9, wherein the means for retaining the sample based on predetermined criteria further comprises means for retaining the survivor sample having the largest projection on the vector average of the predetermined group of samples.

11. An apparatus for estimating a channel in a communication system, the communication system implementing signals including a data sequence having errors as a result of a transmission of the signal, the apparatus making a channel estimate based on a plurality of estimated Walsh symbols, the apparatus comprising:

means for receiving a transmitted signal which includes the data sequence;

means for despreading the data sequence into Walsh chips;

means for transforming the Walsh chips into a plurality of FHT outputs one of which contains information related to the data sequence;

means for estimating which one of the plurality FHT outputs contains the information related to the data sequence;

means for determining if the estimate of the one FHT output containing the information related to the data sequence is incorrect; and means for discarding the estimate so that it is not used to make a channel estimate if it is determined that the estimate is incorrect.

* * * * *